United States Patent [19]  
Loszewski

[11] Patent Number: 4,510,272  
[45] Date of Patent: Apr. 9, 1985

[54] BIS-MALEIMIDE-EPOXY COMPOSITIONS AND PREPREGS

[75] Inventor: Raymond C. Loszewski, Windham, N.H.

[73] Assignee: Avco Corporation, Wilmington, Mass.

[21] Appl. No.: 475,836

[22] Filed: Mar. 16, 1983

[51] Int. Cl.$^3$ ............... C08G 59/40; C08G 83/00
[52] U.S. Cl. ........................ 523/400; 523/445; 523/466; 523/468; 525/530; 525/903; 528/94; 528/99; 528/117; 528/322
[58] Field of Search ............ 528/94, 99, 117, 322; 523/400, 445, 466, 468; 525/530, 903

[56] References Cited

U.S. PATENT DOCUMENTS

| | | | |
|---|---|---|---|
| 3,637,901 | 1/1972 | Bargain et al. | 528/322 X |
| 3,839,493 | 10/1974 | Balme et al. | 528/321 X |
| 3,875,113 | 4/1975 | Lefebvre et al. | 528/117 |
| 4,211,861 | 7/1980 | Stenzenberger | 528/322 |
| 4,237,262 | 12/1980 | Jones | 528/322 |
| 4,269,966 | 5/1981 | Stenzenberger | 528/322 |
| 4,273,916 | 6/1981 | Jones | 528/117 |
| 4,283,521 | 8/1981 | Jones | 528/117 |
| 4,288,359 | 9/1981 | Graham | 528/117 X |
| 4,351,932 | 9/1982 | Street et al. | 526/262 |
| 4,393,188 | 7/1983 | Takahashi et al. | 528/117 X |

OTHER PUBLICATIONS

Lee & Neville, *Handbook of Epoxy Resins*, McGraw-Hill, N.Y. 1967, pp. 2–21.

*Primary Examiner*—Earl A. Nielsen  
*Attorney, Agent, or Firm*—George W. Neuner; Abraham Ogman

[57] ABSTRACT

A novel composition is described comprising an admixture of an unsaturated polyimide prepolymer essentially free of terminal amine groups and an epoxy resin having a homopolymerization temperature that is greater than the temperature at which the polyimide polymerizes. These compositions maintain the superior glass transition temperatures and moisture resistance of the polyimide while picking up the desirable handling properties of the epoxy. These compositions have excellent high temperature and moisture resistant properties and excellent storage stability. For instance, carbon composites made with these materials have exhibited 60% shear property retention at 450° F. after being boiled in water for one week. Also described are prepregs comprising the novel composition, methods for curing the novel composition to obtain the superior properties, and articles of manufacture comprising the novel composition.

76 Claims, No Drawings

BIS-MALEIMIDE-EPOXY COMPOSITIONS AND PREPREGS

FIELD OF INVENTION

This invention relates to novel resinous compositions for use in structural composites, more particularly to compositions containing maleimide resins and to mixtures of bis- and/or tris-maleimide resins and epoxy resins, especially such compositions for use with fiber reinforcements to make high performance composites.

BACKGROUND OF THE INVENTION

Fiber reinforced plastic (FRP) composites have found increasing usage as a replacement for metal and other structural materials especially with automotive and aerospace industries due to their high strength and low weight. Epoxy resins have been the matrix resins generally used in high performance FRP composites. Carbon fiber, epoxy matrix composites are routinely used for secondary structural applications in contemporary aircraft. However, epoxy resins typically exhibit poor strength at elevated temperatures after aging in humid environments, i.e. they exhibit depressed glass transition temperatures (Tg), especially after thermal cycling under very humid wet conditions.

State-of-the-art epoxies for matrix applications, such as those based on tetraglycidyl methylenedianiline (TGMDA) cured with aromatic diamines, such as 4,4'-diaminodiphenylsulfone (4,4'DDS), present structural processing problems such as high flow, and have poor properties such as moisture sensitivity and low hot wet strength, poor fracture toughness and low impact strength. New materials are needed that offer simpler cure cycles, lower flow, and that exhibit better toughness and storage properties at temperatures above 0° F.

Bis-maleimide resins exhibit good humidity resistance and are capable of use as matrix resins in humid, high temperature environments. However, the available bis-maleimide resin systems have generally exhibited poor handleability, brittleness and long cure times even at high curing temperatures up to 475° F. Carbon and high modulus graphite composites cured with these resins have exhibited severe microcracking after environmental aging due to thermal, mechanical or physical gradients between the resin and fibers.

A bis-imide matrix resin system comprising 50 to 95 percent by weight of ethylenically unsaturated bis-imides, preferably a low melting mixture of a major portion of maleimides of aromatic amines with a minor portion of maleimide of an aliphatic amine, and 5 percent to 35 percent by weight of a di-unsaturated low-temperature cross-linking agent such as divinyl benzene which gels the bis-imide at low temperatures is described in U.S. Pat. No. 4,351,932. This composition is said to reduce stress between the matrix resin and the surface of the reinforcing fiber, thus reducing the tendency to form microcracks. Microcracking is said to be further reduced and transverse strength increased by the addition of 0 to 15% of compatible elastomers to the resin and cross-linking agent. Heat resistance and cross-link density are said to be improved by the presence of 0 to 10% of a trifunctional curing agent. The divinyl benzene contributes to room temperature tackiness but it is undesirable to use divinyl benzene commercially because it compromises handling due to volatility and odor.

Low temperature curable compositions of bis-maleimide and epoxy are described in U.S. Pat. Nos. 4,273,916 and 4,293,521.

U.S. Pat. No. 4,273,916 describes a prepolymer comprised of the reaction product of at least one aliphatic bis-maleimide, at least one aromatic amine and at least one aromatic bismaleimide that is combined with at least one cycloaliphatic epoxy resin having a melting point less than about 120° F. and at least two functional epoxy groups to provide a low temperature curable composition. U.S. Pat. No. 4,283,521 describes a prepolymer comprised of the reaction product of at least one aliphatic bismaleimide, at least one aromatic amine and at least one aromatic bismaleimide in combination with an aromatic and/or a cycloaliphatic epoxy resin providing at least two functional epoxy groups to provide a low temperature curable composition.

U.S. Pat. No. 4,211,861 describes thermosetting imide resins that are obtained by reacting an N,N'-bis-imide of an unsaturated dicarboxylic acid with the hydrazide of an amino acid, preferably in the molar proportion between about 1.1 and about 10.0. The resulting prepolymerization products can also be prepared in organic solvents or diluents. By heating at atmospheric pressure or under pressure to a temperature between about 100° C. and about 350° C. and preferably between about 160° C. and 260° C., if desired, in the presence of curing catalysts or inhibitors, the prepolymerization products are cured and hardened to substantially insoluble, infusible, highly cross-linked imide resins.

U.S. Pat. No. 4,269,966 describes polyimide prepolymers that are produced by reacting an unsaturated dicarboxylic acid imido acylchloride with a difunctional amine to produce the corresponding acid amide. Condensation of said reactants is preferably effected in solution in a low boiling solvent. The resulting prepolymer is hardened and completely polymerized by heating, preferably between about 80° C. and about 400° C., to yield a cross-linked, substantially infusible and insoluble polyimide resin.

The increasing use of composite materials in primary structures as well as in secondary structures is changing the prepreg market demands. Because higher volume production requires more efficiency, greater yields and automation, processors are in search of prepregs which can offer: oven curability or compatibility with existing autoclaves (as opposed to requiring high temperature and/or high pressure autoclave); low pressure cure (14 psi); room temperature storage; low but consistent tack (e.g. for automatic laydown machines); low bleed; and suitable adhesive properties of the prepreg.

Designers are looking for: non flammability; low smoke and toxicity; improved impact; repairability; improved hot wet compression and moisture resistance at 350° F.; and thermal and mechanical stability at 450° F. Polymers or formulations available to date are deficient in one or more of the desired properties.

Even though the properties of epoxy resins are less than desired, there has been no known suitable high temperature replacement that offers better cost effective performance than epoxy resins. Thus, new resins and resin formulations are needed, particularly for use at higher temperatures and in primary structures where long-term durability is a major concern.

SUMMARY OF THE INVENTION

The present invention provides a novel composition comprising an admixture of an unsaturated polyimide prepolymer essentially free of terminal amine groups and an epoxy resin having a homopolymerization temperature that is greater than the temperature at which the polyimide polymerizes. These compositions maintain the superior glass transition temperatures and moisture resistance of the polyimide while picking up the desirable handling properties of the epoxy. These compositions have excellent high temperature and moisture resistant properties and excellent storage stability. For instance, carbon composites made with these materials have exhibited 60% shear property retention at 450° F. after being boiled in water for one week.

The invention also includes prepregs comprising the novel composition, methods for curing the novel composition to obtain the superior properties, and articles of manufacture comprising the novel composition. The prepegs of this invention comprise a web of a fibrous material coated or impregnated with the admixture of polyimide and epoxy resins as set forth herein. Preferably, the web consists of structural reinforcements such as carbon, graphite, boron, silicon carbide, or glass fibers, etc.

The composition of this invention is cured by the method comprising (1) heating the admixture to a temperature sufficiently high to cause the polyimide to polymerize but not high enough to cause substantial homopolymerization of the epoxy for a period of time sufficient to polymerize the polyimide to a degree such that it could be handled and usable if polymerized under the same conditions without the epoxy and (2) further heating the admixture to a temperature sufficiently high and for a period of time sufficient to cause the epoxy to homopolymerize substantially when heated under the same conditions without the polyimide. For purposes of this invention, the epoxy is not substantially homopolymerized if less than 25% by weight of the epoxy resin alone does not polymerize under the same conditions.

DESCRIPTION OF THE INVENTION

Thermoset compositions of the present invention comprise an admixture of an unsaturated polyimide prepolymer essentially free of terminal amine groups and an epoxy resin wherein the polyimide is present in an amount of from 10 to 99 percent by weight based on the weight of the polyimide prepolymer and the epoxy resins. Preferably, the polyimide is present in the admixture in an amount of from 30 to 90 percent and, more preferably, in an amount of from 50 to 80 percent.

The imides useful in the practice of the present invention include all unsaturated polyimides, such as bis-imides, tris-imides, etc. Bis-imides such as the bis-maleimides are more generally available commercially and thus are preferred. However, tris-imides offer higher crosslink density and at least one tris-maleimide is now availble commercially. Various imides can be used alone or in combination with other imides, reactants or modifiers. Suitable polyimides include, for instance, the N,N'-bis-imides of an unsaturated carboxylic acid and can be selected from compounds of the formula:

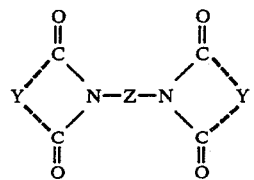

where Y represents a divalent radical of at least 2 carbon atoms, preferably 2 to 6 carbon atoms containing a carbon-carbon double bond and Z is a divalent radical containing at least 1 carbon atoms and generally not more than 20 carbon atoms. Z may be aliphatic, cycloaliphatic, aromatic or heterocyclic. Y may be derived from acids or anhydrides such as maleic acid, citraconic acid, tetrahydrophthalic acid, nadic methyl anhydride, and the like.

Such polyimides include aliphatic and aromatic bis-maleimides of the formula:

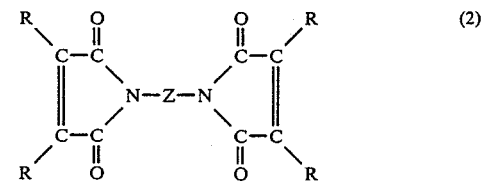

wherein each R is independently hydrogen, an aliphatic group containing 1 or 2 carbon atoms, a benzenoid radical, or a halogen; and Z is a polyaliphatic ether preferably a polyaliphatic ether in which the aliphatic groups independently contain from 1 to about 6 carbon atoms and preferably having a molecular weight in the range of about 300 to about 10,000, or a bifunctional benzenoid radical selected from the group consisting of

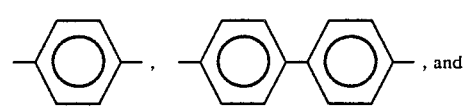, and

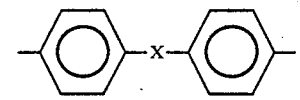

wherein X is selected from the group consisting of —O—, —S—, —SO$_2$—, CH$_2$—, C$_2$H$_4$—, CO—, —C$_3$H$_6$—, and

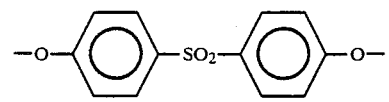

Representative N,N'-bis-imides that may be employed are the N,N'-bis-maleimides of ethylene diamine, hexamethylene diamine, phenylene diamine, trimethyl-hexamethylene diamine, methylene dianiline, toluene diamine, 4,4'-diphenylmethane diamine, 3,3'-diphenylsulfone diamine, 4,4'-diphenylether diamine, 4,4'-diphenylsulfone diamine, 4,4'-dicyclohexanemethane diamine, metaxylylene diamine, or 4,4'-diphenylcyclohexane diamine and mixtures thereof. Other N,N'- bis-maleimides and their process of preparation are disclosed in U.S. Pat. Nos. 3,562,223, 3,627,780 and 3,839,358, the disclosures of which are expressly incorporated herein by reference.

Preferred maleimides include:

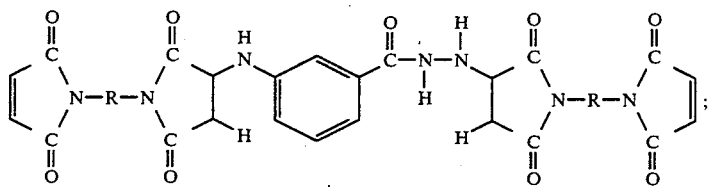
(3)

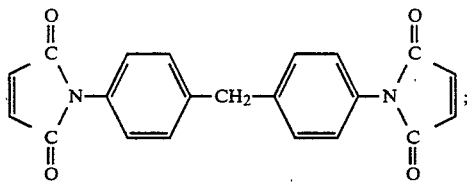
(4)

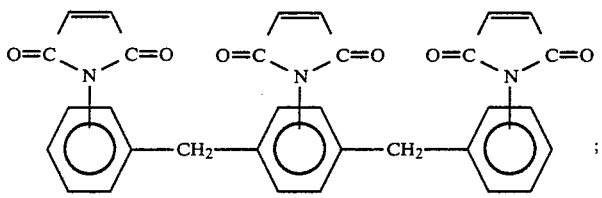
(5)

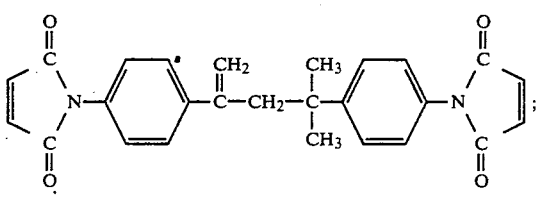
(6)

and

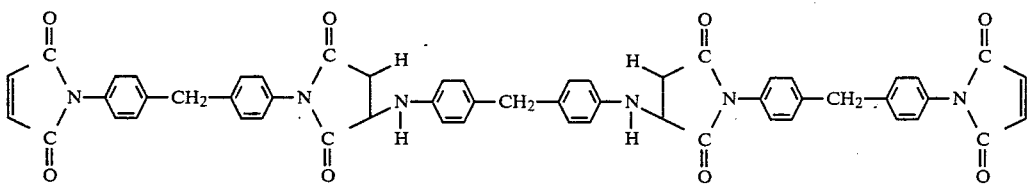
(7)

Epoxies useful in the practice of the present invention include any unreacted epoxy having suitable homopolymerization properties for the particular polyimide being used. An extensive list of commercially available epoxies is provided by Lee and Neville, *Handbook of Epoxy Resins,* McGraw-Hill, Inc., pp. 4–58 through 4–70 (1967), which is hereby incorporated by reference. Preferred epoxies for the practice of the present invention should have a viscosity less than about 10,000 cp at 120° F. and most preferably less than about 1000 cp at room temperature. Preferred epoxies for the practice of the present invention are the glycidyl amine epoxies. However, epoxies based on bisphenol A and novolac resins are also useful. Tertiary amines, other Lewis bases, or other catalysts for promoting homopolymerization can be used to tailor the reactivity of the epoxies for use in accord with this invention.

Specific epoxies suitable for the practice of the present invention include, for example:

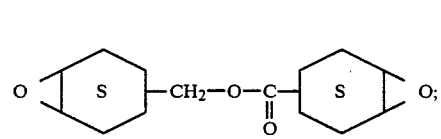
(8)

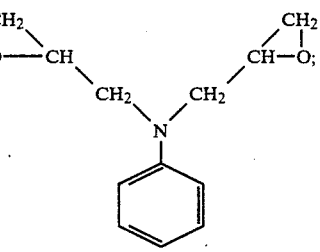
(9)

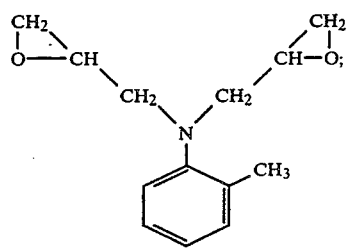 (10)

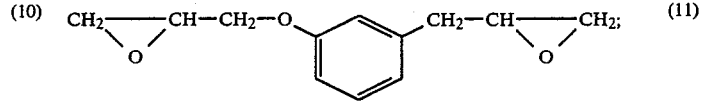 (11)

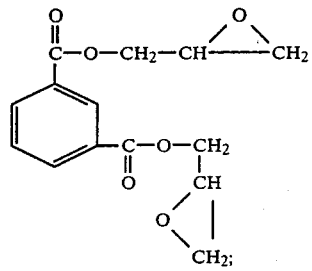 (12)

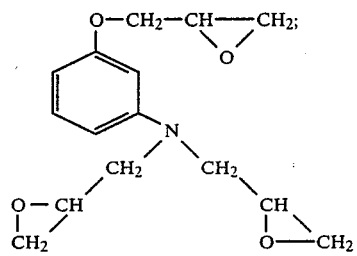 (13)

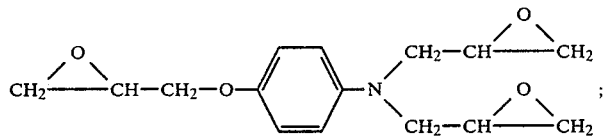 (14)

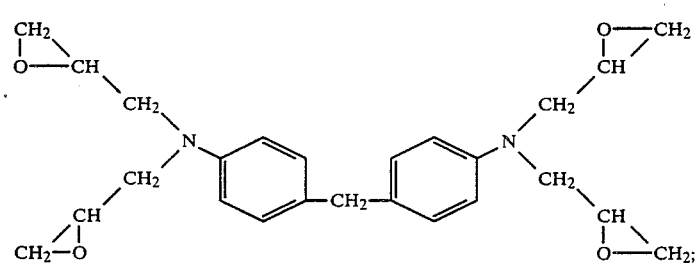 (15)

and

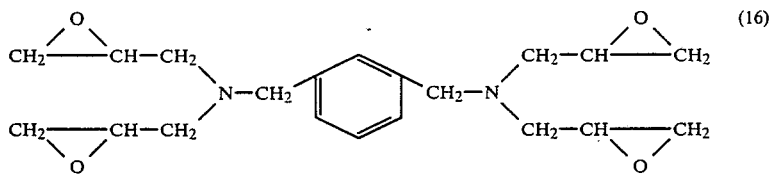 (16)

Presently preferred compositions of this invention comprise from about 30 to 70 parts by weight of the bimaleimide of formula (3) or the tris-maleimide of formula (5) and from about 25 to 45 parts by weight of the epoxy of formula (14).

The compositions of the present invention can also contain additives such as inert fillers, pigments, extenders, plasticizers, flexibilizers, etc. to provide their known functions. Any modifier conventionally used for epoxies and/or bis-imides can be used in the compositions of this invention. For instance, the compositions can contain about 0 to 15% by weight of elastomers that are compatible with the bis-imide and epoxy resins. Compatible elastomers remain dispersed within the matrix resin during temperature cyclization and do not migrate to the surface. The presence of these elastomers also contributes transverse strength in both the uncured and cured states of 0 degree undirectional tape high modulus graphite composites. Representative resins are polyether polysulfones having molecular weights from 10,000 to 20,000, linear homopolymers of bis-phenol epoxies having molecular weights from 40,000 to 120,000 preferably mixtures of both of these elastomers in an amount of 0.5 to 3% by weight of each, or other suitable, elastomers, for example polyacrylonitrile or polyacrylic esters such as ethyl-hexylacrylate. Suitable fillers include, for instance, glass fibers, carbon fibers, organic high-modulus fibers such as aramides, quartz powder, Kaolin, silicon dioxide, cab-o-sil, and metals, metal salts and oxides in the form of fine powders.

Prepregs, in accord with the present invention, are made by coating woven or non-woven webs, filaments, rovings, or the like with the above polyimide/epoxy resin compositions. The resin is applied as a hot melt or a solution to the fiber reinforcement. The composition of this invention can be designed to dissolve in common industrial solvents such as, for example, acetone, methylethyl ketone, or preferably methylene chloride or other similiar aprotic solvents such as chlorinated hydrocarbons, and the like. Fibers useful for making prepregs of this invention include organic or inorganic fibers, for example, glass fibers, carbon or graphite fibers, boron fibers, carbide coated boron fibers, silicon carbide fibers, organic synthetic fibers, and the like, and mixtures thereof.

Hot melt application is preferred. The resin is applied to the fiber or cloth in an amount of 20% to 50% by weight of resin solids, preferably 25% to 40% by weight to form a prepreg. The resin system is cured by heating the resin to temperatures typically in the range of from 120° C. to 320° C. for up to 20 hours.

The compositions of the present invention are made by admixing the polyimide prepolymers or reactants into the epoxy. Typically, the polyimide is pulverized and used as a powder having a particle size of about a 100 mesh screen. The epoxy is usually heated to a temperature sufficient to dissolve the polyimide particles but below that necessary for reaction of the polyimide, preferably less than 115° C. A temperature of about 100° C.±5° C. is generally suitable for this purpose. The time and the temperature necessary for this treatment to take place can vary to some degree depending on the percentage of polyimide resin to be incorporated in the final product, and the particle size and shape of the polyimide resin being incorporated. Thus, higher loading and large particle size require longer heat treatment times and/or higher temperature to get the polyimide resin into solution or homogenous dispersion in the epoxy resin. As will be understood in the art, the time period and the temperature necessary can be reduced by mechanical mixing of the ingredients. Typical time for dissolution of about 70% by weight of pulverized polyimide into 30% epoxy resin is about 15 minutes at 100±5° C. (2 Kg batch size). Upon appropriate dispersion and/or dissolution of the imide resin, its appearance preferably changes from opaque to clear or translucent. Good results have also been obtained with fine dispersions of a bis-imide at about a 10 micron particle size. It is important to maintain the temperature below about 150° C. and preferably below 120° C. during the admixing step to prevent premature advancement of the resin with subsequent loss in tack and handleability. Gel time for that reaction at 150° C. is typically about 7 to 8 minutes, but varies between formulations and can be as long as one hour.

After the polyimide is incorporated in the epoxy, the admixture is quenched, either in air, in water, or by other suitable methods depending upon the batch size or process used.

Other methods of obtaining an intimate admixture of the epoxy resin and the polyimide resin may also be used. For example co-extrusion of the mixture through a single or multiple barrel extruder for short amount of time will often produce the desired dispersion.

For ease of handling the resinous admixture can be chilled to a solid, then is broken into chunks, or granulated, or pelletized. To make prepreg by the hot melt method, the particles of resin are loaded into a hopper and melted, typically at a temperature of about 90° C. The hot melt is then coated on a web of differential release paper. This coated paper is then used to apply the resin to the fiber web. The fiber web, such as graphite fiber is sandwiched between two webs of coated paper with the resin side facing the fiber and run between two heated pressure rollers to bind the resin and fiber and thus produce prepreg.

The prepreg can then be used to make structural parts for airplanes, or for other conventional uses. The prepreg is cut into strips and layed up to the desired shape by conventional techniques. The part is then heated under pressure (preferably 50 to about 400 psig) in an oven, autoclave or a heated pressure mold, at a temperature that favors the addition reaction of the polyimide to polymerize the polyimide before significant homopolymerization of the epoxy portion of the admixture. Continued heating will cure the epoxy as well. The cure temperature can be adjusted to control the reaction rates and the degree of interaction between the polyimide and epoxy. A temperature of about 175° C. is generally found suitable for this first heat treatment. This first heat treatment is held for a period of time sufficient to obtain a part that can be handled, typically from 1 to about 4 hours. Generally about 1½ hours is sufficient for the initial cure.

The part is then treated (or post-cured) at a higher temperature for a period of time sufficient to complete the crosslinking reactions of the initial cure. The particular temperature and length of time depends upon the particular epoxy and polyimide being used. Generally it is desirable to keep this second heat treatment time to 4 hours or less. However, longer times may be required to fully polymerize and crosslink the resin system to obtain the desired properties. The length of time can be reduced by adding suitable curing agents or catalysts to the admixture. Such curing agents should be selected so that the epoxy will not significantly polymerize while the polyimide is undergoing the addition polymerization. The second heat treatment step is preferably conducted at a temperature greater than 200° C., generally in the range of about 200° C. to about 360° C., and more preferably in the range of about 200° C. to about 275° C.

The foregoing has been found to be successful in accord with conventional curing schedules however, alternatively, the part can be cured by heating at 2°–3° C. per minute until the highest desirable temperature is reached and the part then held at this temperature for final cure.

Curing agents can also be employed to modify the final properties of the cured admixture. For instance, one can pre-react some epoxy for flexibility or for flow control.

The resin compositions of the present invention can also be processed to molded articles according to known methods of powder molding techniques as they are employed in curing of thermosetting plastic materials. To achieve this result hardening or curing takes place under pressure whereby molding is effected at the same time by conventional techniques. The resin compositions of this invention can also be tailored for use as adhesives by adjusting the proportion of polyimide and epoxy in accord with the intended use.

Although not wishing to be bound by theory, we believe that the curing of the polyimide/epoxy admixture in accord with our invention can be explained as follows. In the first curing step there is a polymerization reaction involving primarily the addition reactions of the unsaturated polyimide with amines or with other unsaturated sites of the polyimide where the epoxy resin acts as a diluent for the reaction. Some reaction of the epoxy with amine moieties and/or homopolymerization of the epoxy may also take place at this time but, due to the time and temperature conditions of the initial curing, these secondary and minor reactions do not substantially polymerize the epoxy i.e. it remains a substantial diluent for the polyimide.

Subsequent heating or post-cure conditions are then used that promote the homopolymerization of the epoxy resin. It is believed that, during this post-cure, groups are created in situ that copolymerize the epoxy into the polyimide backbone. For instance, it is known that terminal reactions for epoxy homopolymerization creates vinyl and hydroxyl end groups that can copolymerize the epoxy into the polyimide backbone. Conventional catalysts are not typically required to be added to the admixture in order to crosslink the epoxy with the polyimide, but such catalysts may be added to modify properties such as, for example, to further crosslink certain epoxies with the polyimide.

Typically, one goes to higher temperatures to get the required molecular mobility to force the reaction to completion. In accord with the present invention, the epoxy diluent enhances molecular mobility at lower temperatures to enable the polyimide reaction to go to completion.

It is recognized that chemical sites on the epoxy can catalyze the polyimide polymerization and vice versa where sites on the polyimide can catalyze epoxy homopolymerization leading to a higher overall degree of polymerization than would be expected if the epoxy and polyimide were polymerized independently. This also allows for more complete reactions at lower temperatures.

Unlike classical diluents which often compromise the properties, the epoxy diluent in this invention actively aids in the development of the composition. Subsequent heating polymerizes the epoxy to form an interpenetrating polymer network.

Epoxy homopolymerization leads to termination reactions in situ that generate unsaturation such as vinyl, or other active groups such as hydroxyl can interact with the polyimide to form a copolymer.

Therefore, it is apparent that the compositions of the present invention have a synergistic effect when cured and provide properties surprisingly better than would have been expected from such mixtures prior to this invention.

The invention will be further illustrated by the examples that follow. In the following example percents and ratios are by weight unless otherwise stated, and the following definitions apply:

| | |
|---|---|
| H795 - | Bismaleimide having structural formula (3) sold by Technochemie of Germany |
| CAB-O-SIL M-5 - | fumed silica thixotrope sold by Cabot Corp. |
| 3,3'DDS - | 3,3'-Diaminodiphenylsulfone |
| LSU-931 - | aromatic amine epoxy hardener sold by Ciba Geigy Corp. |
| XU-276 - | Impact modified version of MY720, an epoxy[tetraglycidyl methylenedianiline] (TGMDA) sold by Ciba Geigy Corp. |
| TPAP - | Epoxy triglycidyl p-aminophenol [4-(2,3-epoxy) propoxy-N,N—bis (2,3-epoxypropyl)-aniline] sold by Ciba Geigy Corp. |
| TYPE M - | Trismaleimide having formula (5) sold by Mitsui Toatsu Chemical Co. of Japan |

EXAMPLES 1-8

The formulations tabulated below were prepared by heating the epoxy resin to 100±5° C. and mixing into the epoxy about 100 mesh sized powder of bis- or trismaleimide and other additives as indicated. A two kilogram batch was typically mixed in one-half hour or less. After the imide was dissolved and additives mixed, the resin admixture was air cooled by spreading it out in a sheet.

TABLE I

| Ingredients (parts by weight) | Examples | | | | | | | |
|---|---|---|---|---|---|---|---|---|
| | 1 | 2 | 3 | 4 | 5 | 6 | 7 | 8 |
| H795 | 70 | 30 | 45 | — | — | — | — | — |
| TPAP | 29 | 41 | 38 | 38 | 34.5 | 33 | 35 | 41 |
| CAB-O-SIL M-5 | 1 | 1 | 1 | 1 | 1 | — | — | 1 |
| 3,3'DDS | — | — | 16 | 16 | 14.5 | — | — | — |
| XU-276 | — | — | — | — | — | 2 | — | — |
| TYPE M | — | — | — | 45 | 50 | 65 | 65 | 30 |
| LSU 931 | — | 28 | — | — | — | — | — | 28 |

Some of the resin formulations of Table I were used to make prepregs. Prepregs containing about 40% of resin solids of the specified formulation were made by hot melt coating the resin onto a graphite fiber wet (T-300, available commercially from Union Carbide. Fifteen (15) plies of the prepeg were placed in a hot bonding press at 100 psig and cured for 1½ hours at about 175° C. The samples were then removed from the press and baked at about 245° C. for two or four hours (post-cure). Properties of the samples are tabulated below (an average of five readings is shown).

TABLE II

| | Formulation (hrs post-cure at 245° C.) | | | |
|---|---|---|---|---|
| Test | Example 1 (2 hrs) | Example 3 (4 hrs) | Example 7 (4 hrs) | Example 8 (2 hrs) |
| R.T. 0° Flexural Strength (ksi) | 283 | 272 | 244 | 300 |
| 350° F. (450° F.) 0° Flexural Strength (ksi) | 292 | 248 | 260(277) | 236 |
| 90° Tensile Strength (psi) | 9,100 | 10,300 | 4800 | 10,900 |
| 90° % Strain | 0.61 | 0.72 | 0.31 | 0.73 |
| R.T. Shear (psi) | 20,800 | 21,200 | 16,100 | 22,000 |
| 350° F. Shear (psi) | 13,600 | 12,200 | 11,500 | 11,900 |
| 450° F. Shear (psi) | 7,700 | 6,500 | 9,600 | — |

Similar results were obtained with composites formed in an autoclave.

Carbon composites made with commercially available epoxy formulations based on TGMDA and 4,4'DDS typically exhibit 0.6% Strain in the transverse direction (90°) at room temperature. Shear at 232° C. is typically beyond their performance capability. Further, such epoxies do not generally exhibit the excellent retention of 0° flexure strength as exhibited in some of the formulations in accord with this invention as illustrated by Table I and II.

The invention has been described in detail including the preferred embodiments thereof. However, it will be appreciated that those skilled in the art, upon consideration of this disclosure, may make modifications and improvements within the spirit and scope of this invention. For instance, mixtures of two or more polyimides and/or two or more epoxy resins can be used to make a composition in accord with this invention.

We claim:

1. A resinous composition comprising an admixture of an unsaturated polyimide essentially free of terminal amine groups and an epoxy having a homopolymerization temperature greater than the temperature at which the polyimide polymerizes.

2. The composition of claim 1 wherein said polyimide is a bis-maleimide having the formula:

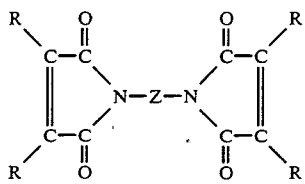
(2)

wherein:
each R is independently selected from hydrogen, an aliphatic radical having 1 or 2 carbon atoms, a benzenoid radical, or a halogen; and
Z is a polyaliphatic ether having a molecular weight in the range of about 300 to 10,000, or a bifunctional benzenoid radical selected from the group consisting of

, and

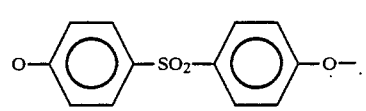

wherein X is selected from the group consisting of —O—, —S—, —SO$_2$—, —CH$_2$—, —C$_2$H$_4$—, —CO—, —C$_3$H$_6$—, and

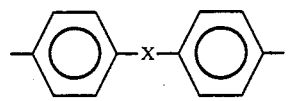.

3. The composition of claim 1 wherein said polyimide is a N,N'-bis-imide selected from the N,N'-bis-maleimides of ethylene diamine, hexamethylene diamine, phenylene diamine, trimethyl-hexamethylene diamine, methylene dianiline, toluene diamine, 4,4'-diphenylmethane diamine, 3,3'-diphenylsulfone diamine, 4,4'-dipenylether diamine, 4,4'-diphenylfulsone diamine, 4,4'-dicyclohexanemethane diamine, metaxylylene diamine, or 4,4'-diphenylcyclohexane diamine and mixtures thereof.

4. The compositions of claim 1 wherein said polyimide is selected from:

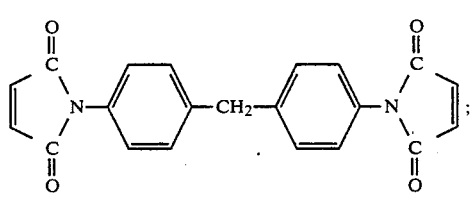 (4)

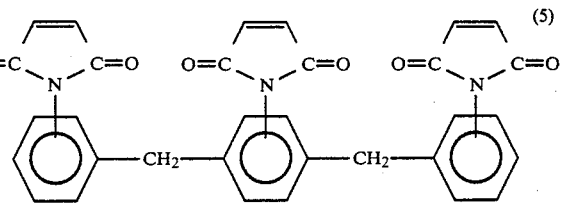 (5)

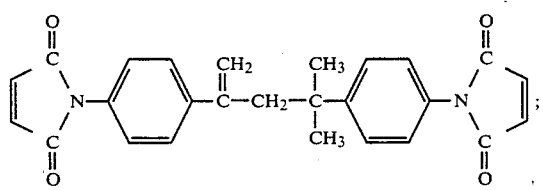 (6)

and

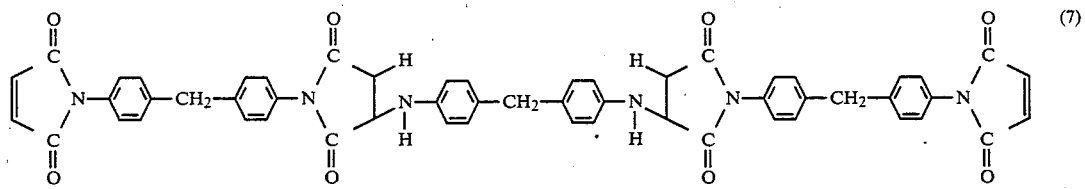 (7)

5. The composition of claim 1 wherein said polyimide is present in an amount of from 10 to 99 percent by weight of the resin admixture.

6. The composition of claim 1 wherein said polyimide is present in an amount of from 40 to 90 percent by weight of the resin admixture.

7. The composition of claim 1 wherein said epoxy is selected from:

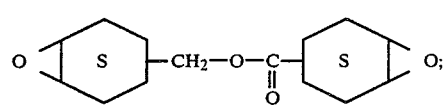 (8)

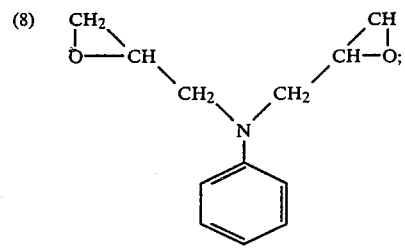 (9)

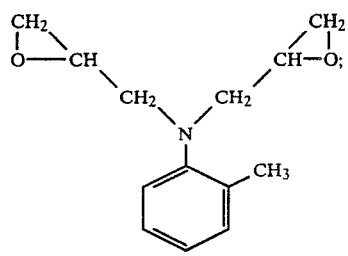 (10)

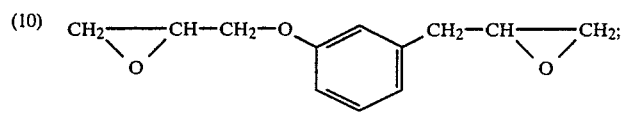 (11)

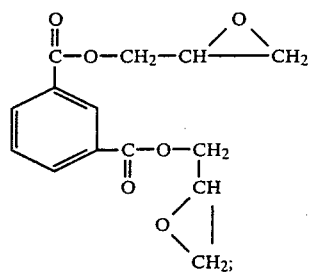 (12)

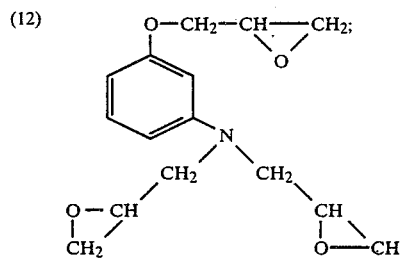 (13)

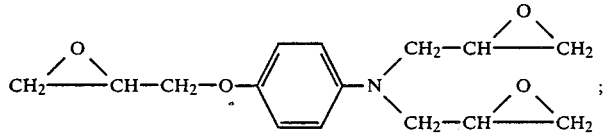 (14)

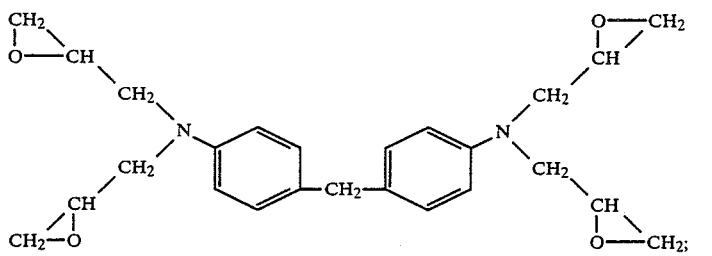 (15)

and

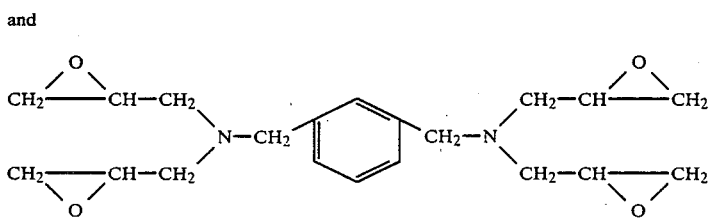 (16)

8. The composition of claim 1 wherein said polyimide is present in an amount of from about 50 to 80 percent by weight of the resin admixture and said epoxy has a viscosity less than about 1000 cp at room temperatures.

9. A cured composition comprised of an admixture of an unsaturated polyimide essentially free of terminal amine groups and epoxy resin wherein said admixture of said polyimide and said epoxy resin has been heated to temperature for a period of time sufficient to polymerize said polyimide but not sufficient to substantially homopolymerize said epoxy resin and, after such polymerization of said polyimide, said admixture has been further heated to a higher temperature for a period of time sufficient to cause said epoxy resin to polymerize.

10. The composition of claim 9 wherein said polyimide is a bis-imide having the formula:

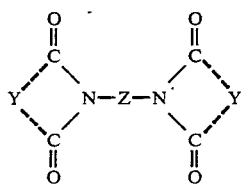 (1)

wherein:
Y is a divalent radical having at least 2 carbon atoms; and
Z is a divalent radical having from 1 to about 20 carbon atoms.

11. The composition of claim 10 wherein Y is derived from malaeic acid, citraconic acid, tetrahydrophthalic acid, or anhydrides thereof.

12. The composition of claim 10 wherein Z is selected from an aliphatic, cycloaliphtic, aromatic or heterocyclic radical.

13. The composition of claim 9 wherein said polyimide is a bis-maleimide having the formula:

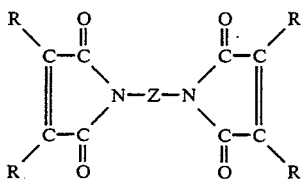 (2)

wherein:

each R is independently selected from hydrogen, an aliphatic radical having 1 or 2 carbon atoms, a benzenoid radical, or a halogen; and
Z is a polyaliphatic ether having a molecular weight in the range of about 300 to 10,000, or a bifunctional benzenoid radical selected from the group consisting of

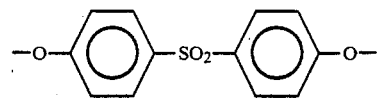, and

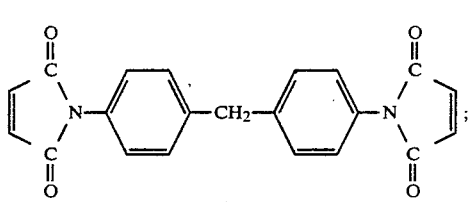

wherein X is selected from the group consisting of —O—, —S—, —SO$_2$—, —CH$_2$—, —C$_2$H$_4$—, —CO—, —C$_3$H$_6$—, and

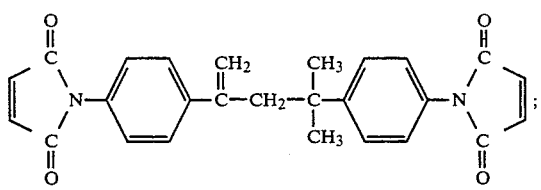

14. The composition of claim 9 wherein said polyimide is a N,N'-bis-imide selected from the N,N'-bis-maleimides of ethylene diamine, hexamethylene diamine, phenylene diamine, trimethyl-hexamethylene diamine, methylene dianiline, toluene diamine, 4,4'-diphenylmethane diamine, 3,3'-diphenylsulfone diamine, 4,4'-dipenylether diamine, 4,4'-diphenylfulsone diamine, 4,4'-dicyclohexanemethane diamine, metaxylylene diamine, or 4,4'-diphenylcyclohexane diamine and mixtures thereof.

15. The composition of claim 9 wherein said polyimide is selected from:

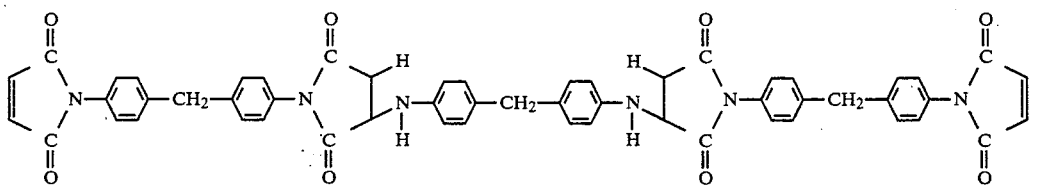

16. The composition of claim 9 wherein said polyimide is present in an amount of from 10 to 99 percent by weight of the resin admixture.

17. The composition of claim 9 wherein said polyimide is present in an amount of from 30 to 90 percent by weight of the resin admixture.

18. The composition of claim 9 wherein said epoxy has a viscosity less than about 10,000 cp at 120° F.

19. The composition of claim 9 wherein said epoxy is a glycidyl amine epoxy.

20. The composition of claim 19 wherein said epoxy has a viscosity of less than about 1000 cp at room temperature.

21. The composition of claim 9 wherein said epoxy is selected from:

22. The composition of claim 9 wherein said polyimide is present in an amount of from about 50 to 80 percent by weight of the resin admixture and said epoxy has a viscosity less than about 1000 cp at room temperatures.

23. The composition of claim 9 wherein said polyimide is substantially polymerized before the epxoy resin is 25% homopolymerized, after which the epoxy resin is homopolymerized.

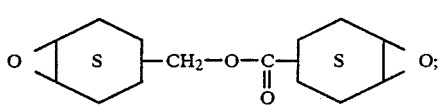 (8)

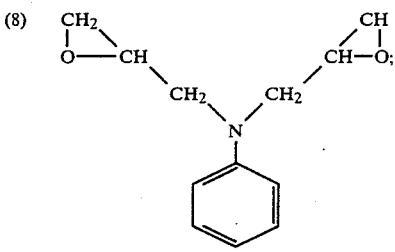 (9)

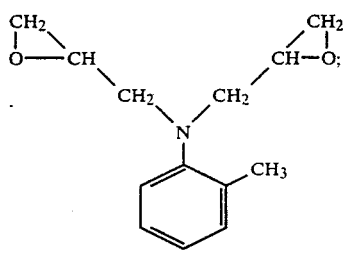 (10)

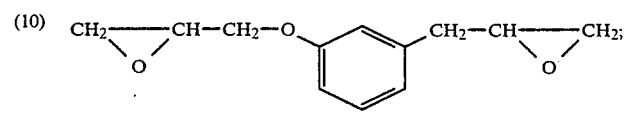 (11)

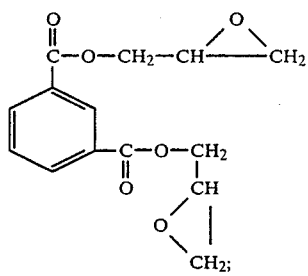 (12)

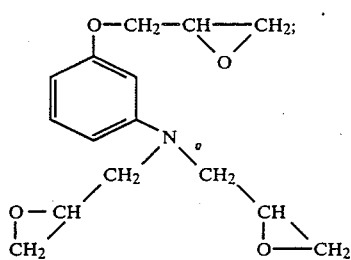 (13)

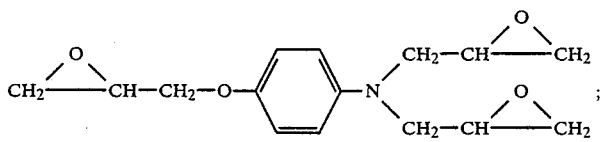 (14)

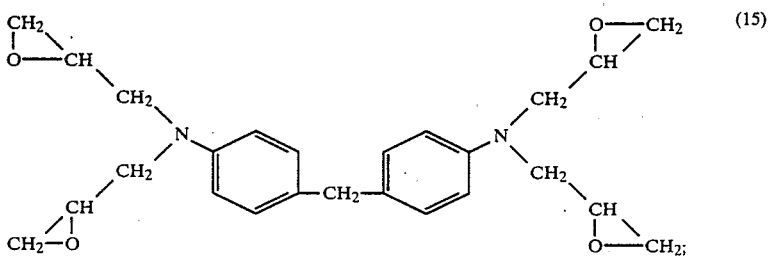 (15)

and

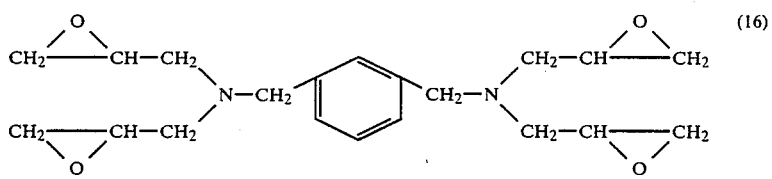 (16)

24. A prepreg comprising a fibrous material coated or impregnated with a composition comprising an admixture of an unsaturated polyimide essentially free of terminal amine groups and an epoxy having a homopolymerization temperature greater than the temperature at which the polyimide polymerizes.

25. The prepreg of claim 24 wherein said polyimide is a bis-imide having the formula:

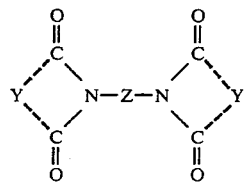
(1)

wherein:
Y is an unsaturated divalent radical having at least 2 carbon atoms; and
Z is a divalent radical having from 1 to about 20 carbon atoms.

26. The prepreg of claim 25 wherein Y is derived from malaeic acid, citraconic acid, tetrahydrophthalic acid, or anhydrides thereof.

27. The prepreg of claim 25 wherein Z is selected from an aliphatic, cycloaliphtic, aromatic or heterocyclic radical.

28. The prepreg of claim 24 wherein said polyimide is a bis-maleimide having the formula:

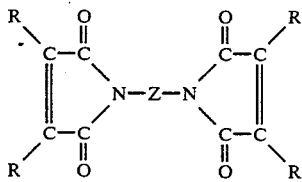
(2)

wherein:
each R is independently selected from hydrogen, an aliphatic radical having 1 or 2 carbon atoms, a benzenoid radical, or a halogen; and
Z is a polyaliphatic ether having a molecular weight in the range of about 300 to 10,000, or a bifunctional benzenoid radical selected from the group consisting of

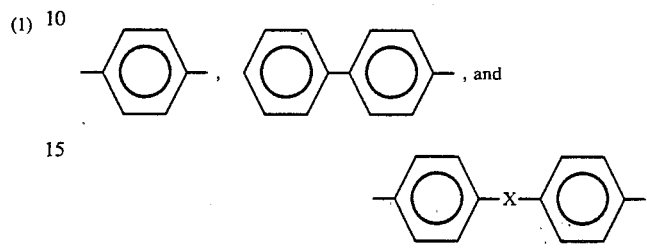
, and wherein X is selected from the group consisting of —O—, —S—, —SO$_2$—, —CH$_2$—, —C$_2$H$_4$—, —CO—, —C$_3$H$_6$—, and

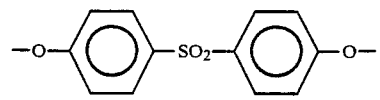

29. The prepreg of claim 24 wherein said polyimide is a N,N'-bis-imide selected from the N,N'-bis-maleimides of ethylene diamine, hexamethylene diamine, phenylene diamine, trimethyl-hexamethylene diamine, methylene dianiline, toluene diamine, 4,4'-diphenylmethane diamine, 3,3'-diphenylsulfone diamine, 4,4'-diphenylether diamine, 4,4'-diphenylfulsone diamine, 4,4'-dicyclohexanemethane diamine, metaxylylene diamine, or 4,4'-diphenylcyclohexane diamine and mixtures thereof.

30. The prepreg of claim 24 wherein said polyimide is selected from:

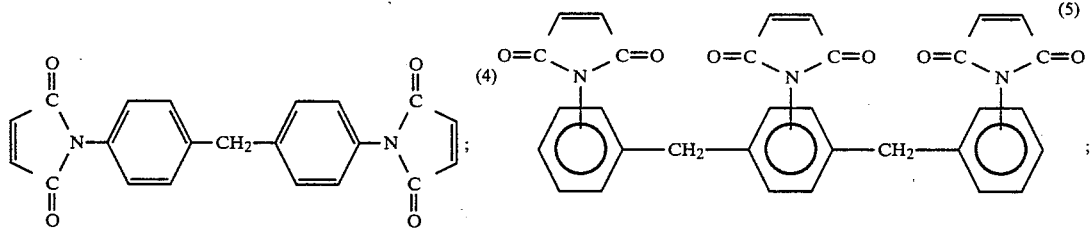

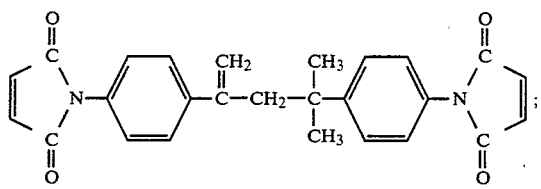

and

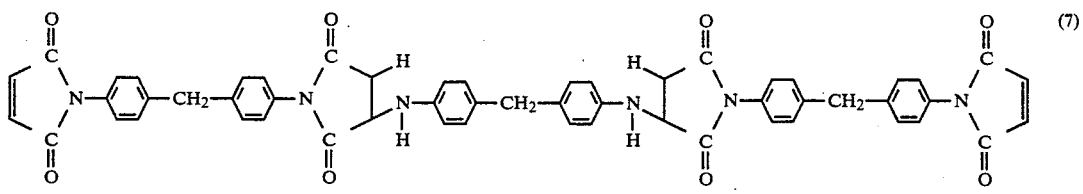

31. The prepreg of claim 24 wherein said polyimide is present in an amount of from 10 to 99 percent by weight of the resin admixture.

32. The prepreg of claim 24 wherein said polyimide is present in an amount of from 30 to 90 percent by weight of the resin admixture.

33. The prepreg of claim 24 wherein said epoxy has a

34. The prepreg of claim 24 wherein said epoxy is a glycidyl amine epoxy.

35. The prepreg of claim 31 wherein said epoxy has a viscosity of less than about 1000° F. at room temperature.

36. The prepreg of claim 24 wherein said epoxy is selected from:

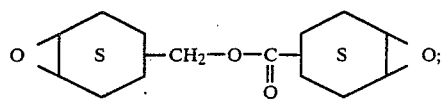 (8)

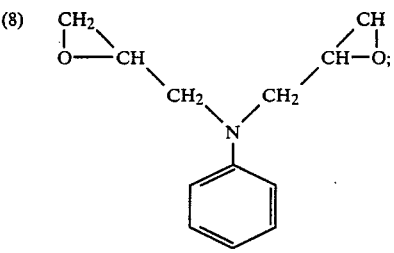 (9)

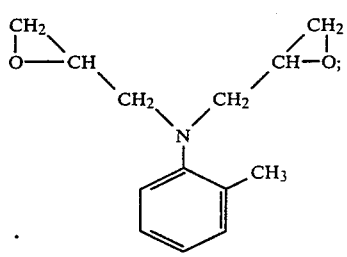 (10)

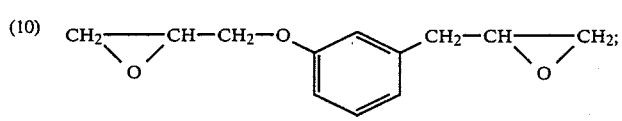 (11)

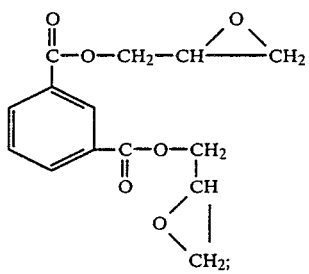 (12)

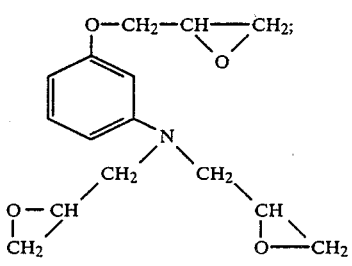 (13)

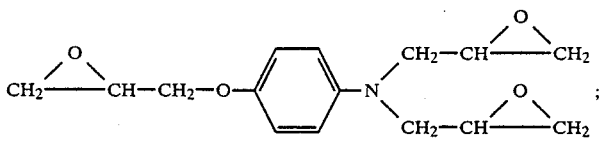 (14)

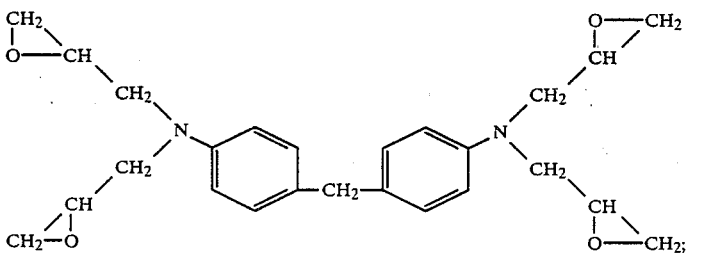 (15)

and

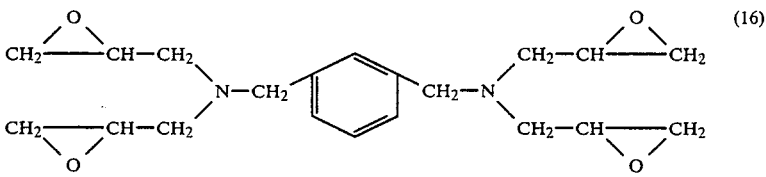 (16)

viscosity less than about 10,000 cp at 120° F.

37. The prepreg claim 24 wherein said polyimide is present in an amount of from about 50 to 80 percent by weight of the resin admixture and said epoxy has a viscosity less than about 1000 cp at room temperatures.

38. The prepreg claim 24 wherein said polyimide is substantially polymerized before the epoxy resin is 25% homopolymerized, after which the epoxy resin is homopolymerized.

39. The prepreg of claim 24 wherein said composition is applied in amount of about 20 to 50% by weight of resin solids.

40. The prepreg of claim 24 wherein said fibrous material is a woven web, a non-woven web, a roving, or a filament comprising glass fibers, carbon fibers, boron carbide fibers, silicon carbide fibers, organic synthetic fibers, or mixtures thereof.

41. An article of manufacture comprising a cured composition comprising an admixture of an unsaturated polyimide essentially free of terminal amine groups and an epoxy having a homopolymerization temperature greater than the temperature at which the polyimide polymerizes, wherein said article is cured by heating said article at a first temperature to polymerize said polyimide while said epoxy functions as a diluent, and subsequently heating said at a second temperature to substantially homopolymerize said epoxy.

42. The article of manufacture of claim 41 wherein said polyimide is a bis-imide having the formula:

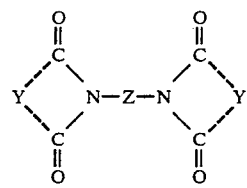

wherein:
Y is an unsaturated divalent radical having at least 2 carbon atoms; and
Z is a divalent radical having from 1 to about 20 carbon atoms.

43. The article of manufacture of claim 42 wherein Y is derived from malaeic acid, citraconic acid, tetrahydrophtalic acid, or anhydrides thereof.

44. The article of manufacture of claim 42 wherein Z is selected from an aliphatic, cycloaliphtic, aromatic or heterocyclic radical.

45. The article of manufacture of claim 41 wherein said polyimide is a bis-maleimide having the formula:

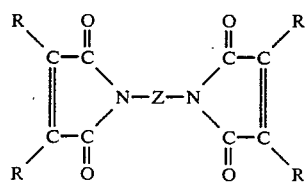

wherein:
each R is independently selected from hydrogen, an aliphatic radical having 1 or 2 carbon atoms, a benzenoid radical, or a halogen; and
Z is a polyaliphatic ether having a molecular weight in the range of about 300 to 10,000, or a bifunctional benzenoid radical selected from the group consisting of

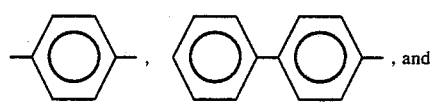, and

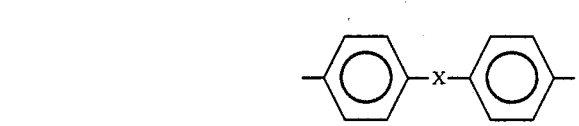

wherein X is selected from the group consisting of —O—, —S—, —SO$_2$—, —CH$_2$—, —C$_2$H$_4$—, —CO—, —C$_3$H$_6$—, and

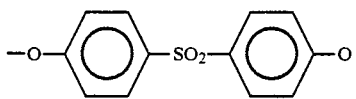

46. The article of manufacture of claim 41 wherein said polyimide is a N,N'-bis-imide selected from the N,N'-bis-maleimides of ethylene diamine, hexamethylene diamine, phenylene diamine, trimethyl-hexamethylene diamine, methylene dianiline, toluene diamine, 4,4'-diphenylmethane diamine, 3,3'-diphenylsulfone diamine, 4,4'-diphenylether diamine, 4,4'-diphenylsulfone diamine, 4,4'-dicyclohexanemethane diamine, metaxylylene diamine, or 4,4'-diphenylcyclohexane diamine and mixtures thereof.

47. The article of manufacture of claim 41 wherein said polyimide is selected from:

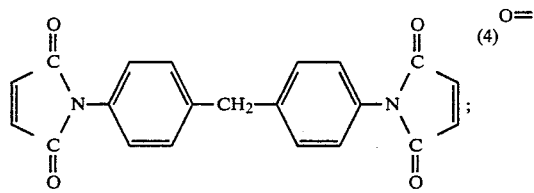

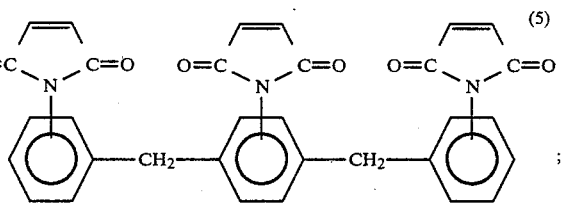

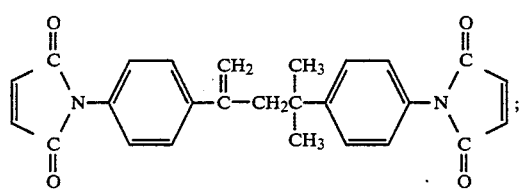

and

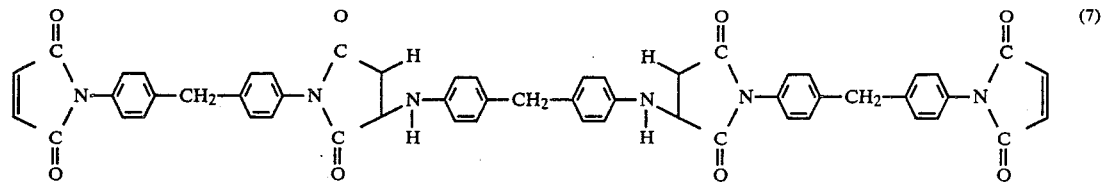 (7)

48. The article of manufacture of claim 41 wherein said polyimide is present in an amount of from 10 to 99 percent by weight of the resin admixture.

49. The article of manufacture of claim 41 wherein said polyimide is present in an amount of from 30 to 90 percent by weight of the resin admixture.

50. The article of manufacture of claim 41 wherein said epoxy has a viscosity less than about 10,000 cp at 120° F.

51. The article of manufacture of claim 50 herein said epoxy is a glycidyl amine epoxy.

52. The article of manufacture of claim 41 wherein said epoxy has a viscosity of less than about 1000 cp at room temperature.

53. The article of manufacture of claim 41 wherein said epoxy is selected from:

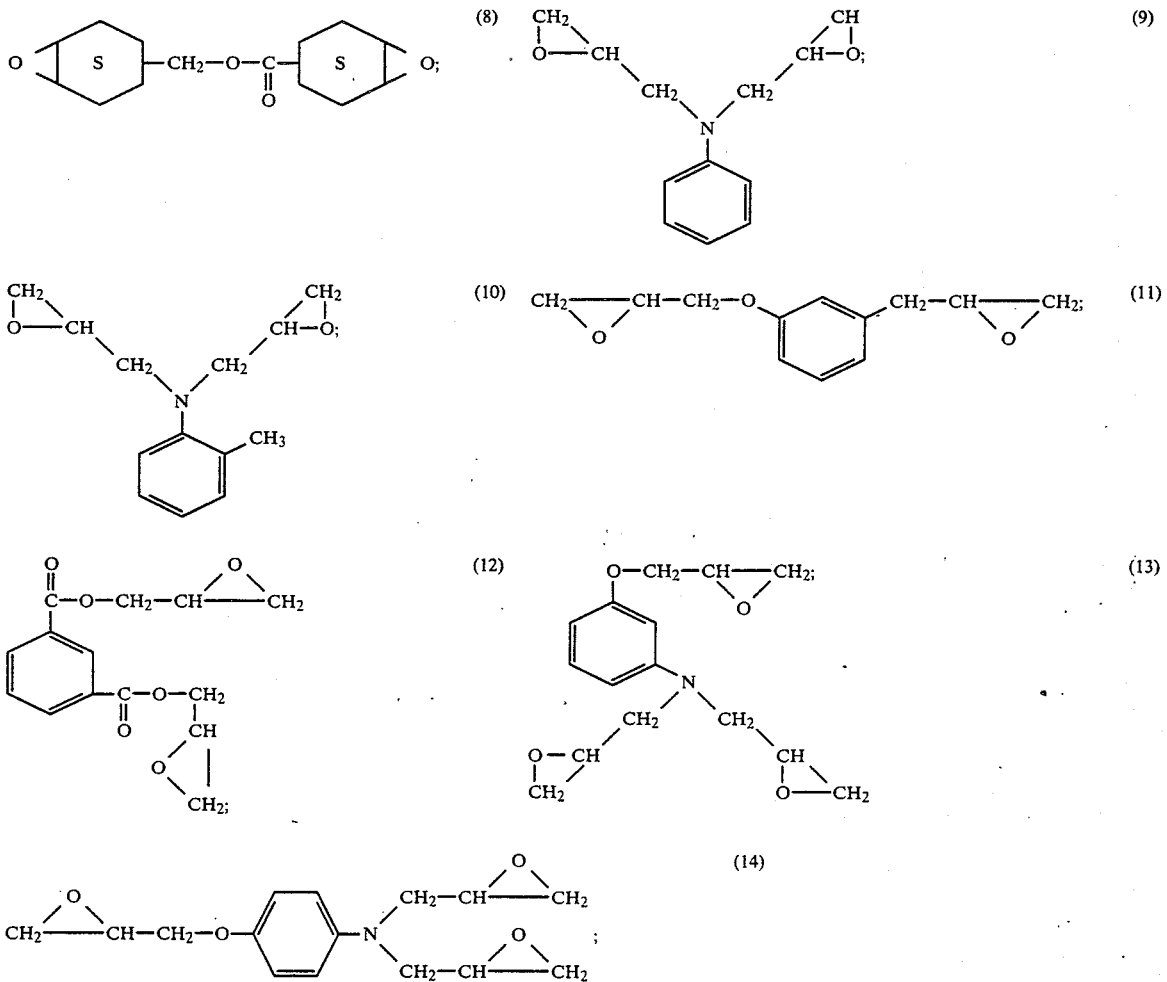

-continued

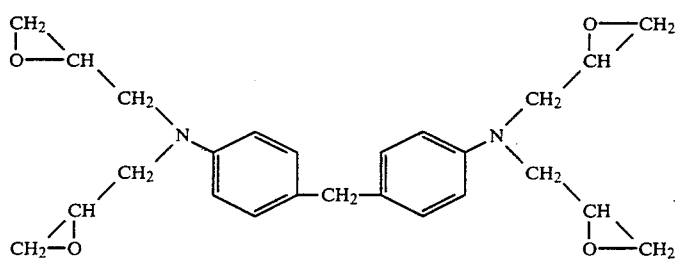 (15)

and

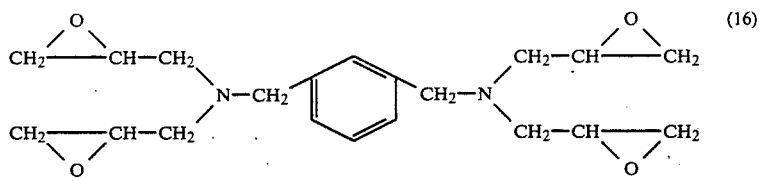 (16)

54. The article of manufacture of claim 41 wherein said polyimide is present in an amount of from about 50 to 80 percent by weight of the resin admixture and said epoxy has a viscosity less than about 1000 cp at room temperatures.

55. The article of manufacture of claim 41 wherein said polyimide is substantially polymerized before the epxoy resin is 25% homopolymerized, after which the epoxy resin is homopolymerized.

56. The article of manufacture of claim 41 further comprising an additive selected from fillers, pigments, extenders, plasticizers and flexibilizers.

57. The article of manufacture of claim 56 wherein said additive is selected from glass fibers, carbon fibers, organic high-modulus fibers, quartz powder, Kaolin, silicon dioxide, cab-o-sil, powdered metal, powdered metal oxides or powdered metal salts.

58. A process for polymerizing an unsaturated polyimide with an epoxy resin, said process comprising:
   admixing said polyimide and said epoxy to form an admixture;
   first heating said admixture to initiate the polymerization of said polyimide in said epoxy which acts substantially as a diluent;
   subsequently further heating said admixture to substantially homopolymerize said epoxy, thereby creating in situ reaction groups that crosslink the epoxy into the polyimide backbone.

59. The process of claim 58 wherein said reaction groups are selected from vinyl groups and hydroxyl groups.

60. The process of claim 58 wherein said admixing step comprises heating said epoxy to a temperature less than 115° C. and dissolving said polyimide into the epoxy.

61. The process of claim 58 wherein said first heating step comprises heating said admixture to a temperature of at least about 150° C. for a period of from one to four hours.

62. The process of claim 61 wherein said temperature is about 175° C..

63. The process of claim 62 wherein said period is about 1½ hours.

64. The process of claim 58 wherein said further heating step comprises heating said admixture to a temperature greater than about 200° C.

65. The process of claim 64 wherein said temperature is in the range of about 200° C. to about 275° C.

66. The process of claim 58 wherein said polyimide is essentially free of terminal amine groups.

67. A composition comprising from 30 to 70 parts by weight of a polyimide and from 25 to 40 parts by weight of an epoxy having the formula:

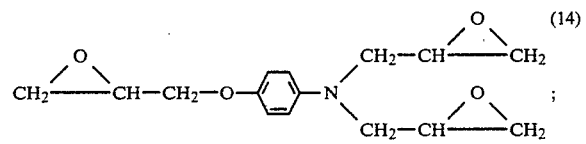 (14)

68. A composition comprising from 30 to 70 parts by weight of a polyimide having the formula:

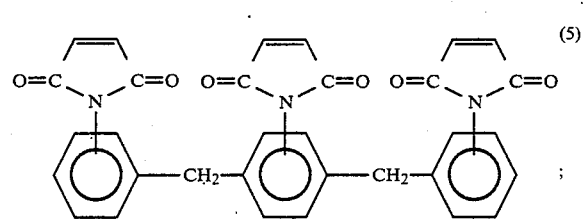 (5)

and from 25 to 45 parts by weight of an epoxy having the formula:

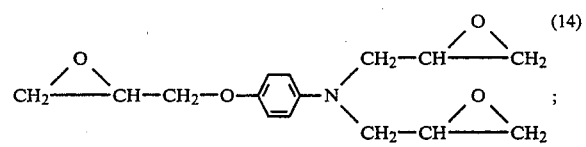 (14)

69. The composition of claim 68 further comprising from 1 to about 5 parts by weight of an impact modified epoxy having the generalized formula:

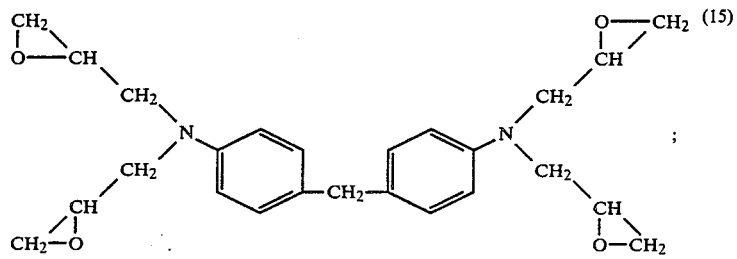

70. A resinous composition comprising an admixture of an unsaturated bis-imide essentially free of terminal amine groups and an epoxy having a homopolymerization temperature greater than the temperature at which the polyimide polymerizes, wherein said bis-imide has the formula:

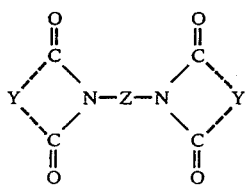

wherein:
Y is an unsaturated divalent radical having at least 2 carbon atoms; and
Z is a divalent radical having from 1 to about 20 carbon atoms.

71. The composition of claim 70 wherein said epoxy has a viscosity less than about 10,000 cp at 120° F.

72. The composition of claim 70 wherein Y is derived from maleic acid, citraconic acid, tetrahydrophthalic acid, or anhydrides thereof.

73. The composition of claim 70 wherein Z is selected from an aliphatic, cycloaliphtic aromatic or heterocyclic radical.

74. A resinous composition comprising an admixture of an unsaturated bis-imide essentially free of terminal amine groups and an epoxy having a viscosity less than about 10,000 cp at 120° F. and a homopolymerization temperature greater than the temperature at which the polyimide polymerizes, wherein said bis-imide has the formula:

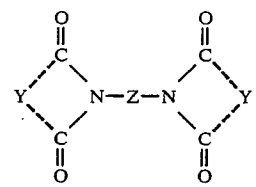

wherein:
Y is an unsaturated divalent radical derived from malaeic acid, citraconic acid, tetrahydrophthalic acid, or anhydrides thereof and has at least 2 carbon atoms; and
Z is a divalent radical selected from an aliphatic, cycloaliphatic, aromatic or heterocyclic radical, and has from 1 to about 20 carbon atoms.

75. An resinous composition comprising an admixture of an unsaturated polyimide essentially free of terminal amine groups and a a glycidyl amine epoxy having a viscosity less than about 10,000 cp at 120° F. and a homopolymerization temperature greater than the temperature at which the polyimide polymerizes.

76. A resinous composition comprising an admixture of an unsaturated polyimide essentially free of terminal amine groups and an epoxy having a viscosity less than about 10,000 cp at 120° F. and a homopolymerization temperature greater than the temperature at which the polyimide polymerizes.

* * * * *

UNITED STATES PATENT AND TRADEMARK OFFICE
CERTIFICATE OF CORRECTION

PATENT NO. : 4,510,272
DATED : April 9, 1985
INVENTOR(S) : Raymond C. Loszewski et al.

It is certified that error appears in the above-identified patent and that said Letters Patent is hereby corrected as shown below:

On the title page, Item [75] should read
--[75] Inventors: Raymond C. Loszewski,
    Windham, N.H., and Robert T.

Alvarez, Laguna Nigull, Calif.--.

Signed and Sealed this

Sixteenth Day of July 1985

[SEAL]

Attest:

DONALD J. QUIGG

*Attesting Officer*       *Acting Commissioner of Patents and Trademarks*